United States Patent
Fish et al.

(10) Patent No.: US 9,986,206 B2
(45) Date of Patent: May 29, 2018

(54) USER EXPERIENCE FOR CONFERENCING WITH A TOUCH SCREEN DISPLAY

(71) Applicant: Microsoft Technology Licensing, LLC, Redmond, WA (US)

(72) Inventors: Nathan J. Fish, Seattle, WA (US); Robert Williams, Salem, OR (US); Charlie W. Case, Lake Oswegon, OR (US); Chris M. Haverty, Portland, OR (US); Peter R. Oehler, Beaverton, OR (US); Michael C. Hilsdale, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/453,278

(22) Filed: Mar. 8, 2017

(65) Prior Publication Data

US 2017/0180678 A1  Jun. 22, 2017

Related U.S. Application Data

(62) Division of application No. 14/033,007, filed on Sep. 20, 2013.

(51) Int. Cl.
*H04N 7/15* (2006.01)
*G06F 1/26* (2006.01)
(Continued)

(52) U.S. Cl.
CPC ............... *H04N 7/15* (2013.01); *G06F 1/266* (2013.01); *G06F 1/325* (2013.01); *G06F 1/3206* (2013.01); *G06F 1/3215* (2013.01); *G06F 1/3231* (2013.01); *G06F 3/011* (2013.01); *G06F 3/0325* (2013.01); *G06F 3/0412* (2013.01); *G06F 3/04883* (2013.01); *G06T 7/70* (2017.01); *H04N 5/247* (2013.01); *H04N 5/2628* (2013.01);
(Continued)

(58) Field of Classification Search
CPC combination set(s) only.
See application file for complete search history.

(56) References Cited

U.S. PATENT DOCUMENTS 5,835,083 A   11/1998  Nielsen et al.
6,424,373 B1  7/2002   Misue et al.
(Continued)

FOREIGN PATENT DOCUMENTS

CN   201392643 Y   1/2010
CN   102176733 A   9/2011
(Continued)

OTHER PUBLICATIONS

Second Written Opinion for International Application No. PCT/US2014/045184, dated Sep. 29, 2015, date of filing Sep. 18, 2014, 6 pages.
(Continued)

*Primary Examiner* — Joseph J Nguyen
(74) *Attorney, Agent, or Firm* — Christopher J. Volkmann; Kelly, Holt & Christenson, PLLC

(57) ABSTRACT

A video conference system includes two cameras placed on opposite sides of a touch screen display. Multimedia processing is performed in order to automatically switch between the cameras and to display items on the touch screen display based on user position or user interactions with the system.

13 Claims, 11 Drawing Sheets

(51) Int. Cl.

| | |
|---|---|
| G06F 3/041 | (2006.01) |
| H04N 7/14 | (2006.01) |
| G06F 1/32 | (2006.01) |
| G06F 3/01 | (2006.01) |
| G06F 3/03 | (2006.01) |
| G06T 7/70 | (2017.01) |
| G06F 3/0488 | (2013.01) |
| H04N 5/247 | (2006.01) |
| H04N 5/262 | (2006.01) |
| H04N 21/422 | (2011.01) |

(52) U.S. Cl.
CPC ... *H04N 7/142* (2013.01); *G06T 2207/30196* (2013.01); *G06T 2207/30244* (2013.01); *H04N 21/42202* (2013.01); *H04N 21/42203* (2013.01); *Y02D 10/173* (2018.01)

(56) References Cited

U.S. PATENT DOCUMENTS

| | | | |
|---|---|---|---|
| 6,894,714 B2 | 5/2005 | Gutta et al. | |
| 7,015,954 B1 | 3/2006 | Foote et al. | |
| 8,127,158 B2 | 2/2012 | Jessup et al. | |
| 8,130,978 B2 | 3/2012 | Sun | |
| 8,358,328 B2 | 1/2013 | Friel et al. | |
| 8,441,515 B2 | 5/2013 | Yam | |
| 8,774,459 B2* | 7/2014 | Jung | G01S 5/0252 348/94 |
| 9,363,476 B2 | 6/2016 | Fish et al. | |
| 2005/0021625 A1* | 1/2005 | Fujimura | H04N 7/147 709/204 |
| 2007/0120971 A1 | 5/2007 | Kennedy | |
| 2008/0055279 A1 | 3/2008 | Osada et al. | |
| 2008/0294917 A1 | 11/2008 | Khan et al. | |
| 2009/0033737 A1* | 2/2009 | Goose | G06F 3/0481 348/14.07 |
| 2009/0060093 A1 | 3/2009 | Narahari et al. | |
| 2009/0123035 A1 | 5/2009 | Khouri et al. | |
| 2009/0244257 A1* | 10/2009 | MacDonald | H04N 7/142 348/14.09 |
| 2010/0013925 A1 | 1/2010 | Fowler et al. | |
| 2010/0103330 A1* | 4/2010 | Morrison | H04N 9/3185 348/744 |
| 2010/0123770 A1* | 5/2010 | Friel | H04N 7/15 348/14.08 |
| 2010/0182450 A1* | 7/2010 | Kumar | H04N 1/00002 348/229.1 |
| 2010/0201313 A1 | 8/2010 | Vorenkamp et al. | |
| 2010/0226487 A1* | 9/2010 | Harder | G06F 1/325 379/202.01 |
| 2010/0231576 A1 | 9/2010 | Tsai et al. | |
| 2010/0315483 A1 | 12/2010 | King | |
| 2011/0050840 A1* | 3/2011 | Ryu | H04N 7/142 348/14.01 |
| 2012/0169838 A1* | 7/2012 | Sekine | H04N 7/15 348/14.16 |
| 2012/0287222 A1 | 11/2012 | Liu et al. | |
| 2012/0293606 A1 | 11/2012 | Watson et al. | |
| 2012/0295540 A1 | 11/2012 | Hong et al. | |
| 2012/0295708 A1 | 11/2012 | Hernandez-Abrego et al. | |
| 2012/0314015 A1 | 12/2012 | Watson et al. | |
| 2013/0063537 A1 | 3/2013 | Emori | |
| 2013/0076617 A1 | 3/2013 | Csaszar et al. | |
| 2013/0085796 A1 | 4/2013 | Ruffolo | |
| 2013/0090073 A1 | 4/2013 | Zhu et al. | |
| 2013/0141324 A1 | 6/2013 | Zambrano et al. | |
| 2013/0152153 A1 | 6/2013 | Weiser et al. | |
| 2013/0314313 A1 | 11/2013 | Ericson et al. | |
| 2013/0318521 A1 | 11/2013 | Monaghan et al. | |
| 2014/0063179 A1 | 3/2014 | Kawano | |
| 2014/0285476 A1* | 9/2014 | Cho | G06F 1/1601 345/204 |
| 2015/0052853 A1 | 3/2015 | Li et al. | |
| 2015/0085060 A1 | 3/2015 | Fish et al. | |
| 2015/0085063 A1 | 3/2015 | Fish et al. | |
| 2015/0189233 A1 | 7/2015 | Carpenter et al. | |

FOREIGN PATENT DOCUMENTS

| | | |
|---|---|---|
| CN | 102395935 A | 3/2012 |
| CN | 102843540 A | 12/2012 |
| EP | 2293559 A2 | 3/2011 |
| EP | 2439625 A2 | 4/2012 |
| EP | 2538236 A2 | 12/2012 |
| JP | 2007272365 A | 10/2007 |
| WO | 9931889 A1 | 6/1999 |
| WO | 2012170559 A2 | 12/2012 |

OTHER PUBLICATIONS

"International Search Report and Written Opinion Issued in PCT Patent Application No. PCT/US2014/056184", dated Dec. 22, 2014, 11 Pages.

Bragdon, et al., "Code Space: Touch + Air Gesture Hybrid Interactions for Supporting Developer Meetings", In Proceedings of the ACM International Conference on Interactive Tabletops and Surfaces, Nov. 13, 2011, 10 pages.

"The Lync Room System (LRS)", Published on: Feb. 19, 2012, Available at: http://blogs.technet.com/b/lync/archive/2013/02/19/the-lync-room-systems-lrs.aspx.

Prosecution History for U.S. Appl. No. 14/033,003 including: Amendment dated Dec. 10, 2015, Non-Final Office Action dated Sep. 10, 2015, Response to Restriction Requirement dated Jul. 21, 2015, Requirement for Restriction/Election dated Jun. 9, 2015, Response to Notice to File Missing Parts dated Feb. 6, 2014, and Notice to File Missing Parts dated Oct. 15, 2013, 38 pages.

International Preliminary Report on Patentability for International Application No. PCT/US2014/056184, dated Dec. 8, 2015, date of filing: Sep. 18, 2014, 21 pages.

International Search Report and Written Opinion for International Application No. PCT/US2014/056108, dated Mar. 26, 2015, Date of Filing: Sep. 17, 2014, 20 pages.

Second Written Opinion for International Application No. PCT/US2014/056108, dated Oct. 6, 2015, date of filing: Sep. 17, 2014, 9 pages.

International Preliminary Report on Patentability for International Application No. PCT/US2014/056108, dated Dec. 22, 2015, date of filing: Sep. 17, 2014, 21 pages.

Prosecution History for U.S. Appl. No. 14/033,003 including: Issue Notification dated May 18, 2016, Corrected Notice of Allowance dated Feb. 26, 2016, and Notice of Allowance dated Feb. 10, 2016, 10 pages.

Lee, et al. "Gaze-corrected View Generation Using Stereo Camera System for Immersive Videoconferencing", In IEEE Transactions on Consumer Electronics, vol. 57, Issue 3, Aug. 2011, 8 pages.

Prosecution History for U.S. Appl. No. 14/033,007 including: Final Office Action dated Jan. 5, 2017, Amendment dated Oct. 28, 2016, Non-Final Office Action dated Jun. 30, 2016, Amendment with RCE dated May 31, 2016, Final Office Action dated Mar. 7, 2016, Amendment dated Dec. 28, 2015, Non-Final Office Action dated Nov. 13, 2015, Response to Restriction Requirement dated Oct. 13, 2015, and Restriction Requirement dated Sep. 14, 2015, 116 pages.

Communication Pursuant to Article 94(3) EPC for European Patent Application No. 14 781 749.8 dated May 12, 2017, 8 pages.

"First Office Action and Search Report Issued in Chinese Patent Application No. 201480051934.6", dated Jan. 2, 2018, 16 Pages.

\* cited by examiner

USER EXPERIENCE FOR CONFERENCING WITH A TOUCH SCREEN DISPLAY

CROSS-REFERENCE TO RELATED APPLICATION

The present application is a divisional of and claims priority of U.S. patent application Ser. No. 14/033,007, filed Sep. 20, 2013, the content of which is hereby incorporated by reference in its entirety.

BACKGROUND

Many conferencing systems are currently available. Some such systems have video conference capabilities in which a camera is placed in a conference room, in a location that enables the camera to capture video images of people sitting around a table or focusing on a presenter from a distance.

Such conference room solutions normally are not well equipped for a scenario in which a user approaches a screen or whiteboard or other collaborative workspace. Therefore, such systems often place a single camera above or below the workspace, in the conference room.

Touch screen displays are also currently in wide use. Some touch screen displays can be used in a collaborative way in which local and remote users interact with a touch screen display or other collaborative work surface at their location.

As the touch screen displays become larger, camera placement presents more challenges. Cameras mounted on top of the touch screen display often present the remote user with a camera view that is similar to that of a security camera. This is often an awkward view. This top camera placement is also unable to capture video images of people standing to the left or to the right of the collaborative work surface. When it does capture images of those people, it often only captures the tops of their heads, especially when a local user is working in close proximity to the display, and especially when the local user is directly in front of the display, which happens often when the user is drawing on or interacting with content on the collaborative work surface.

Cameras that are mounted on the bottom of the screen are often too low to present a convenient view. In addition, they often present an awkward image, especially when a user approaches the display or is working in close proximity to the display. Also, as screens get larger, the bottom of the screen may fall near or below a standard conference room table, not allowing enough room for the camera to see above the table.

The discussion above is merely provided for general background information and is not intended to be used as an aid in determining the scope of the claimed subject matter.

SUMMARY

A video conference system includes two cameras placed on opposite sides of a touch screen display. Multimedia processing is performed in order to automatically control power, control the placement of displayed items, and control switching between the cameras, based on user position or user interactions with the system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
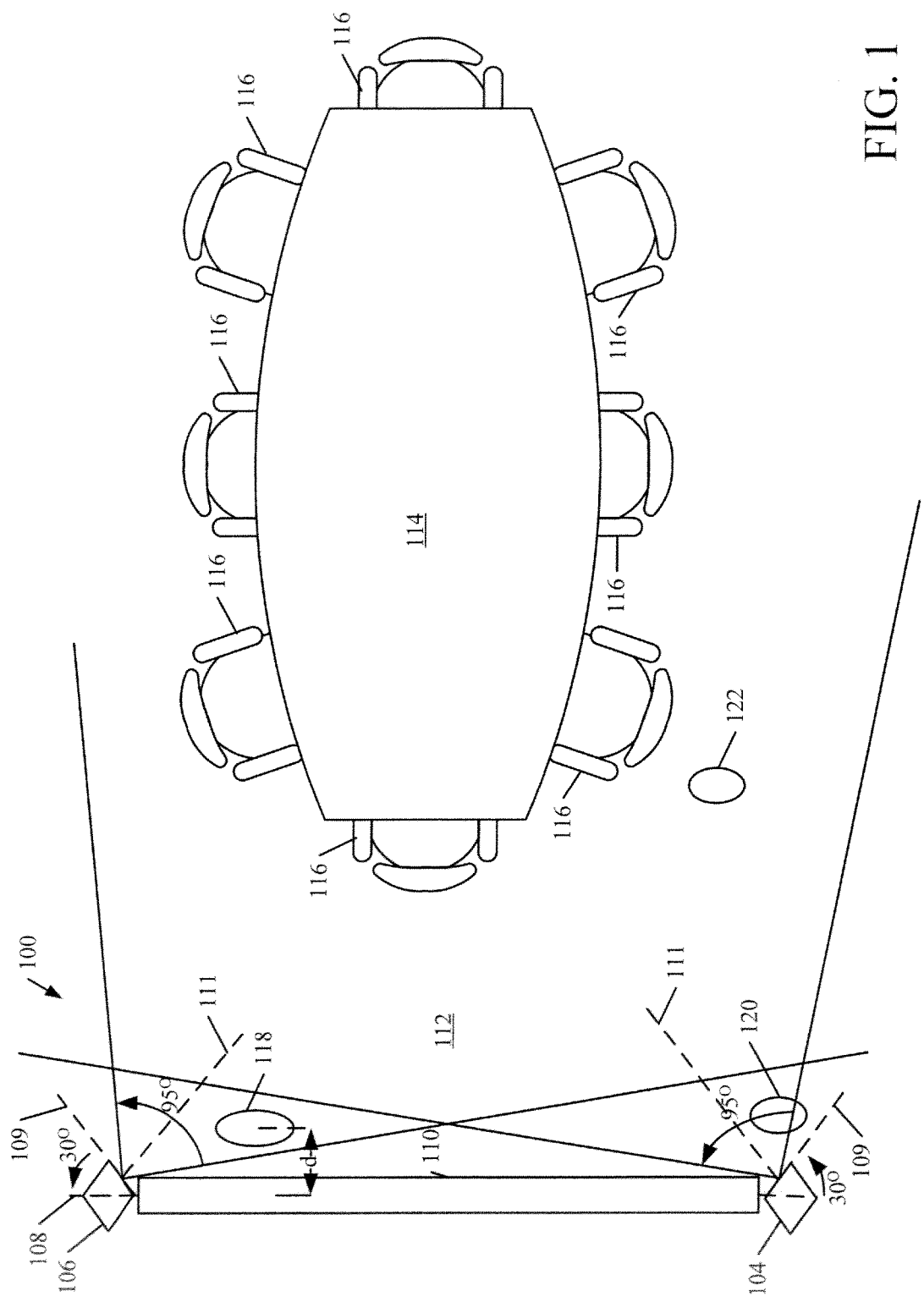
FIGS. 1 and 2 show top views of exemplary video conferencing systems.
Figure 2:
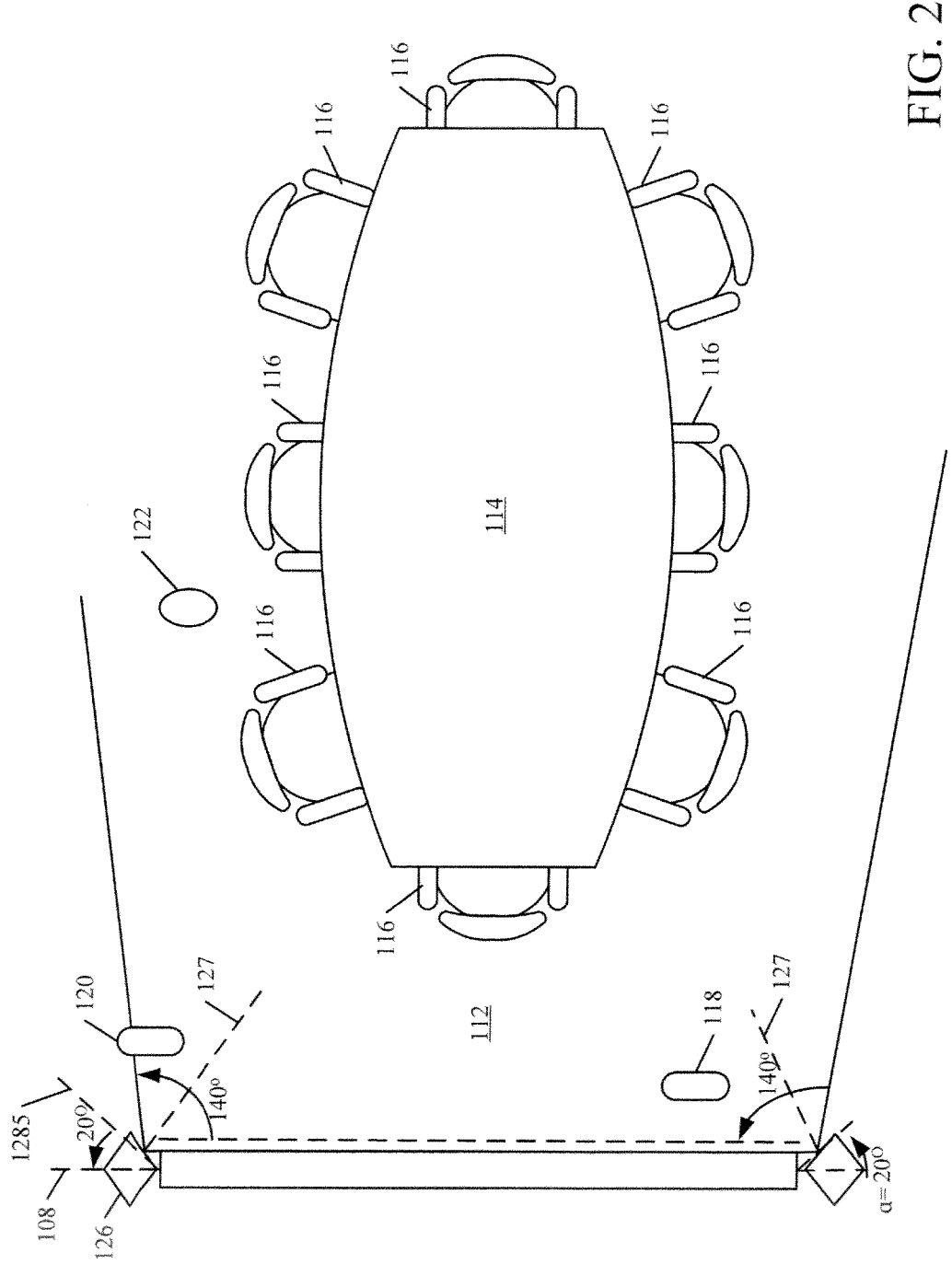

FIGS. 1 and 2 are top views of a portion of an illustrative multimedia conferencing architecture 100 in accordance with one embodiment. A more detailed block diagram of architecture 100 is described below with respect to FIG. 3. FIGS. 1 and 2 are provided to give an overall context. FIG. 1 shows that architecture 100 includes touch sensitive display device 102, a first camera 104 and a second camera 106. It will also be noted that architecture 100 includes a multimedia processing system and various other sensors and user input/output (I/O) mechanisms that are described in greater detail below with respect to FIG. 3.

In the embodiment shown in FIG. 1, cameras 104 and 106 illustratively have a horizontal field of view that is larger than 90 degrees and may be, for instance, approximately 95 degrees. Cameras 104 and 106 can also each be comprised of two or more cameras with smaller horizontal fields of view, and the images from those cameras can be stitched together to obtain a composite image with a horizontal field of view that is in excess of 90 degrees. Touch sensitive display device 102 resides in a plane that has a longitudinal axis generally indicated by number 108. A viewing and touch sensitive display screen 110, on device 102, faces a conference room 112 that is shown, in FIG. 1, with a conference room table 114 and a plurality of chairs 116. Architecture 100 also shows two different exemplary locations that a user might occupy including a first location 118 and a second location 120. When the user is at location 118, the user may illustratively be facing the touch sensitive display screen 110 and be working on a collaborative surface displayed on the touch sensitive display screen 110 of device 102. When the user is at location 120, the user is off to the side of screen 110 and may, therefore, be making a presentation using the touch sensitive display screen 110 but generally facing conference room 112.

FIG. 1 also shows that the user (or another user) may be in one of the chairs 116, or that the user (or another user) may be at a location 122 that is located at a distance further from device 102 than either positions 118 and 120. When the user is at location in one of chairs 116, the user may be viewing a presentation being give by another person, or attending a teleconference and viewing images on touch sensitive display screen 110. When the user is at location 122, the user may be either approaching device 102 or moving away from device 102, or simply standing or sitting at the location 122, and observing device 102.

In FIG. 1, cameras 104 and 106 are illustratively positioned relative to device 102 so that they have overlapping fields of vision that encompass a majority of conference room 112, but are generally tilted downward slightly relative to a horizontal plane in conference room 112. Because the field of view of each camera is, for instance, approximately 95 degrees, they are illustratively positioned to be directed inward relative to longitudinal axis 108. In one embodiment, a line 109 perpendicular to the center of the camera's view (generally indicated by line 111) is offset from longitudinal axis 108 by an angle $\alpha$ that is approximately 30 degrees. In other words, the center 111 of the fields of view is directed inward relative to longitudinal axis 108 so the angle formed by axis 108 and line 111 is less than 90 degrees and may be approximately 30 degrees.

In one embodiment, regardless of the cameras' fields of view, the cameras are illustratively positioned so that they capture the face of the user when the user is either standing in front of screen 110 (such as at position 118) or to the side of screen 110 (such as at position 120). Therefore, when the user is working at the touch sensitive screen 110, at least one of cameras 104 and 106 captures the user. Similarly, when the user is presenting from the screen, and is standing off to the side of the screen, at least one of cameras 104 and 106 also captures the user's image. Assume that the user in either of positions 118 or 120 stands a distance d from display screen 110. In one embodiment, the distance d is approximately 10-14 inches. Of course, this is an illustrative range, and the distance d could be other distances as well. In any case, cameras 104 and 106 are illustratively positioned relative to the longitudinal axis of device 102 so that they capture an image of the user who is either standing in front of screen 110 and located at least as close as 10-14 inches from the screen (or further away) and when the user is standing off to the side of device 102 and located a distance of 10-14 inches (or beyond) from the screen. In addition, the fields of view of cameras 104 and 106 illustratively capture at least a majority of conference room 112.

FIG. 2 is a top view of another embodiment of architecture 100, in which similar items are similarly numbered to those shown in FIG. 1. However, in the embodiment shown in FIG. 2, cameras 104 and 106 are replaced by cameras 124 and 126, respectively. Cameras 124 and 126 illustratively have a field of view that is larger than cameras 104 and 106 in FIG. 1 and may be approximately 140 degrees. Therefore, they are positioned relative to the longitudinal axis 108 of device 102 so that their fields of view overlap in a way that is substantially parallel to, and adjacent, the surface of screen 110. The overlapping fields of view of cameras 124 and 126 are also positioned so that they capture a substantial majority of conference room 112, and so that they capture an image of the user when the user is located in front of screen 110 (such as in position 118) or to the side of screen 110, such as in position 120. In the embodiment shown in FIG. 2, cameras 124 and 126 are placed so that the centers of their fields of view (represented by line 127) are perpendicular to a line 128 that is offset from axis 108 by approximately 20 degrees. In other words, the center 127 of the fields of view is directed inward relative to longitudinal axis 108 so the angle formed by axis 108 and line 127 is less than 90 degrees and may be approximately 20 degrees.

In a variety of different embodiments, as will be discussed below, device 102 switches the outgoing video for the conference between the two cameras based on a variety of different factors. In addition, device 102 controls various user input mechanisms, the displays displayed on screen 110, the power up and power down scenarios, as well as a variety of other items that influence the user's experience in interacting with device 102, based on a wide variety of different parameters, including how the user is moving, where the user is located, how the user is interacting with the device 102, etc. These are described below in greater detail.

Figure 3:
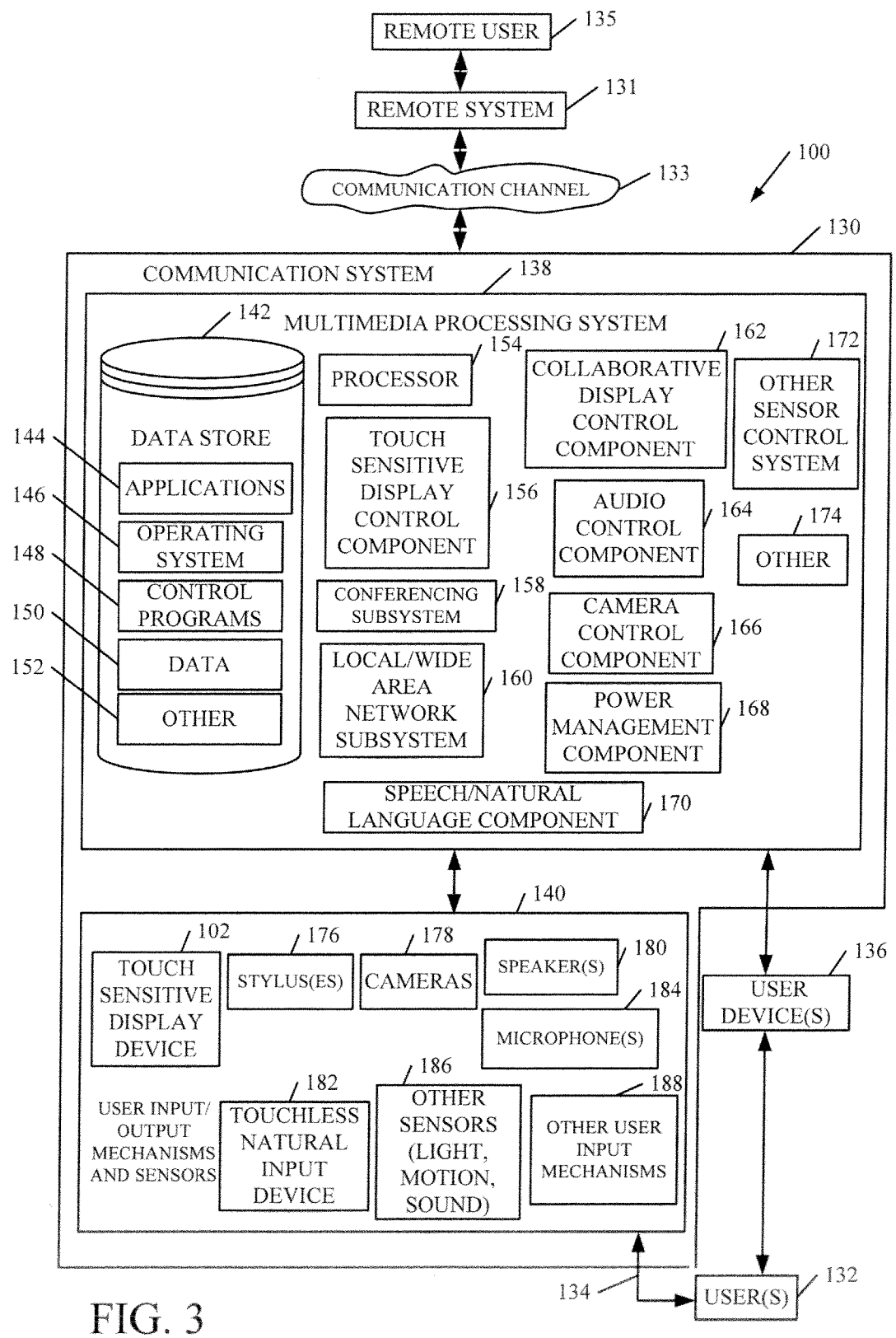
FIG. 3 is a block diagram of one illustrative multimedia processing architecture.

FIG. 3 is a more detailed block diagram of one embodiment of multimedia processing architecture 100. The more detailed diagram of multimedia processing architecture 100 includes conferencing system 130. System 130, itself, includes multimedia processing system 138 and a plurality of different user input/output (I/O) mechanisms 140. FIG. 3 also shows that conferencing system 130 can illustratively be connected for conferencing with one or more remote systems, such as a remote system 131, over a communication channel 133 so that user 132 can communicate, using conferencing system 130, with a remote user 135. Communication channel 133 can include one or more of a variety of different types of communication channels, such as a wide area network, a cellular or switched telephone network, a local area network, or a wide variety of other communication channels.

User 132 interacts with conferencing system 130 either directly, as indicated by arrow 134, or through one or more different user devices 136. For instance, user 132 may interact with conferencing system 130 using a mobile device (such as a smart phone, a tablet computer, or a palmtop computer) using a laptop or desktop computer, etc. Of course, user 132 can also interact directly with system 130 using the various user I/O mechanisms and sensors provided in conferencing system 130.

Multimedia processing system 138 includes data store 142. Data store 142 can include applications 144, operating systems 146, control programs 148, data 150 and other items 152. Multimedia processing system 138 also includes processor 154, touch sensitive display control component 156, conferencing subsystem 158, local/wide area network subsystems 160, collaborative display control component 162, audio control component 164, camera control component 166, power management component 168, and speech/natural language component 170. Multimedia processing system 138 can also include other sensor control systems 172 and a variety of other items as well, as indicated by block 174.

Multimedia processing system 138 is shown as interacting with various user input/output (I/O) mechanisms and sensors 140. Such sensors can include touch sensitive display device 102 (also shown in FIGS. 1 and 2), one or more styluses 176, cameras 104, 106, 124 and 126, collectively referred to by block 178 in FIG. 3, one or more audio speakers 180, touchless natural input device 182, microphones 184, a variety of other sensors (such as light sensors, motion sensors, sound sensors, etc.) as indicated by block 186 and other user input mechanisms 188.

FIG. 3 shows that data store 142 is a single data store and is local to multimedia processing system 138. It should be noted, however, that data store 142 can be remote from system 138, and accessed by system 138. It can also be multiple different data stores, all of which are local to system 138, all of which are remote therefrom, or some of which are local while others are remote. The illustration shown in FIG. 3 is exemplary only.

Processor 154 is illustratively a computer processor with associated memory and timing circuitry, not separately shown. It is a functional part of system 138 and architecture 100, and is activated by the various other components or items in architecture 100 to facilitate their functionality.

Touch sensitive display control component 156 is illustratively a control component that controls the various displays on the touch sensitive display screen 110 of device 102. The various ways that the display can be controlled are described more specifically below with respect to FIGS. 4-9. Of course, these are exemplary descriptions only.

Conferencing subsystem 158 illustratively provides functionality to manage and control conferencing capabilities of architecture 100. For instance, it provides the functionality to initiate communications with remote system 131 over communication channel 133. Of course, this can be performed by multiple different components as well, and the component shown in FIG. 3 is shown for the sake of example only.

Local/wide area network subsystem 160 illustratively provides functionality for enabling communication over a local or wide area network. It also illustratively provides functionality for performing near field communication or other types of networking using wireless or wired communication.

Collaborative display control component 162 illustratively provides the functionality for generating and controlling a collaborative display on the touch sensitive display device 102. For instance, component 162 illustratively generates a collaborative note taking display, whiteboard display, etc., on the touch sensitive display device, and processes the user inputs (from local and remote users) to modify the display accordingly.

Audio control component 164 illustratively provides the control functionality for controlling speakers 180 and microphones 184. For instance, audio control component 164 illustratively switches the active speaker based upon the location of the user relative to the display device, or based upon other parameters, as are described in more detail below.

Camera control component 166 illustratively receives and processes a variety of parameters to control cameras 178. For instance, component 166 illustratively controls which camera is automatically selected as the active camera to provide the outgoing video signal, based upon a variety of sensed parameters. Controlling the cameras and the outgoing video signals is described in greater detail below with respect to FIGS. 5 and 6.

Power management component 168 illustratively provides the functionality for managing the power of the various components, systems, subsystems and items in architecture 100. This can be done in a variety of different ways, such as based on sensed inputs, user position, etc. This is described in greater detail below with respect to FIG. 9.

Speech/natural language component 170 illustratively provides the functionality for receiving, recognizing, and acting on speech inputs. For instance, component 170 can illustratively include speech recognition components, voice recognition components, or other components that enable a user to speak commands or other speech inputs and have them understood and acted upon by the various items in architecture 100.

Other sensor control system 172 illustratively receives sensor inputs from a variety of other sensors and user input mechanisms and provides command and control information based upon those inputs. This is exemplary only.

Touch sensitive display device 102 is illustratively a large display that has touch sensing capability. For instance, device 102 can be a touch sensitive display ranging from, for instance, a twelve inch display to an 82 inch display, or an even larger display. It illustratively provides touch capability so that it can support touch gestures input by a user, using the user's finger, a stylus, another type of pen or pointer, etc. It can illustratively provide a high resolution display (such as a quad HD display) that renders text, ink, and large amounts of content in a very expeditious manner. It also illustratively provides multi-touch capability. Thus, device 102 may illustratively support unlimited touch points, sub-millimeter touch precision, near-zero parallax, ultra-low latency touch response and pen and stylus support, although these need not all be supported.

The touch sensitive display control component 156 illustratively runs code which controls the display. Thus, display device 102 can be a presentation surface that is used by a user (or presenter) who is making a presentation to other individuals in the office. It can also illustratively be operated as a collaborative whiteboard, that enables multiple users across multiple different devices (some of which can be remote) to collaborate on a note taking system, a word processing system, a drawing system, or on any other type of system.

Styluses 176 can illustratively be connected by hardware cables or they can be wireless devices that can be used as pointing devices or to perform other stylus functions, on touch sensitive display device 102. Some of the stylus functionality is described in greater detail below.

As briefly discussed above with respect to FIGS. 1 and 2, cameras 178 can be two different cameras that are configured to provide a wide field of view. They illustratively support viewing people located adjacent the display device, (such as those working at display screen 110 or presenting from it) and up to 20 feet away or more. Camera control component 166 illustratively controls which camera is active, and it can also control various functions, such as cropping, pan, tilt and zoom, etc., some of which are described in greater detail below.

Speakers 180 are illustratively physically located relative to display device 102, and cameras 178, so that they provide audio that corresponds to the incoming and outgoing video. By way of example, if a remote user's video image is displayed on one side of display screen 110 of device 102, then the active speaker that provides the audio for that remote user is also the speaker located on that side of the display device. This is described in greater detail below as well.

Similarly, microphones 184 are illustratively directional microphones, or a microphone array, that is located relative to display device 102 so that it can pick up audio from various users located in different locations relative to display device 102. In one embodiment, microphones 184 are a microphone array mounted to the top of display device 102. When fully utilized, the microphone array produces a signal or set of signals that indicate where a user is located (e.g., from a left/center/right horizontal perspective). Audio control component 164 can illustratively control which microphones 184 are active based upon the location of various users relative to display device 102, and based upon other parameters as well.

Touchless natural input device 182 can take a wide variety of different forms. For instance, in one embodiment, it includes a motion sensing input device for a game or other console. It is based around a webcam style peripheral device that enables users to control and interact with the console without touching a controller. This can be done, for instance, using a natural user interface that detects gestures and spoken commands. It can use an infrared projector and camera to track the movements of objects and individuals in three-dimensions. It can include a camera, a depth sensor and a multi-array microphone that provides full-body, three-dimensional motion capture, facial recognition and voice recognition capabilities. This is exemplary only.

Other sensors 186 can include light sensors (such as for sensing when someone turns on a light in a conference room or for sensing other light conditions in the vicinity of device 102) motion sensors, for sensing things such as when individuals enter the conference room or move about within the conference room, and sound sensors that can pick up and identify various sounds, in addition to microphones 184. Of course, other or different user input mechanisms 188 can be used as well, and these can include keyboards, keypads, displayed (touch sensitive) control components such as soft keyboards, icons, links, dynamic links or tiles, buttons, and other hardware input mechanisms, such as pointing devices (like a mouse or track ball), and a wide variety of other user input mechanisms. The mechanisms can be actuated using a wide variety of different methods as well, such as voice commands, touch gestures, stylus inputs, etc.

Figure 4:
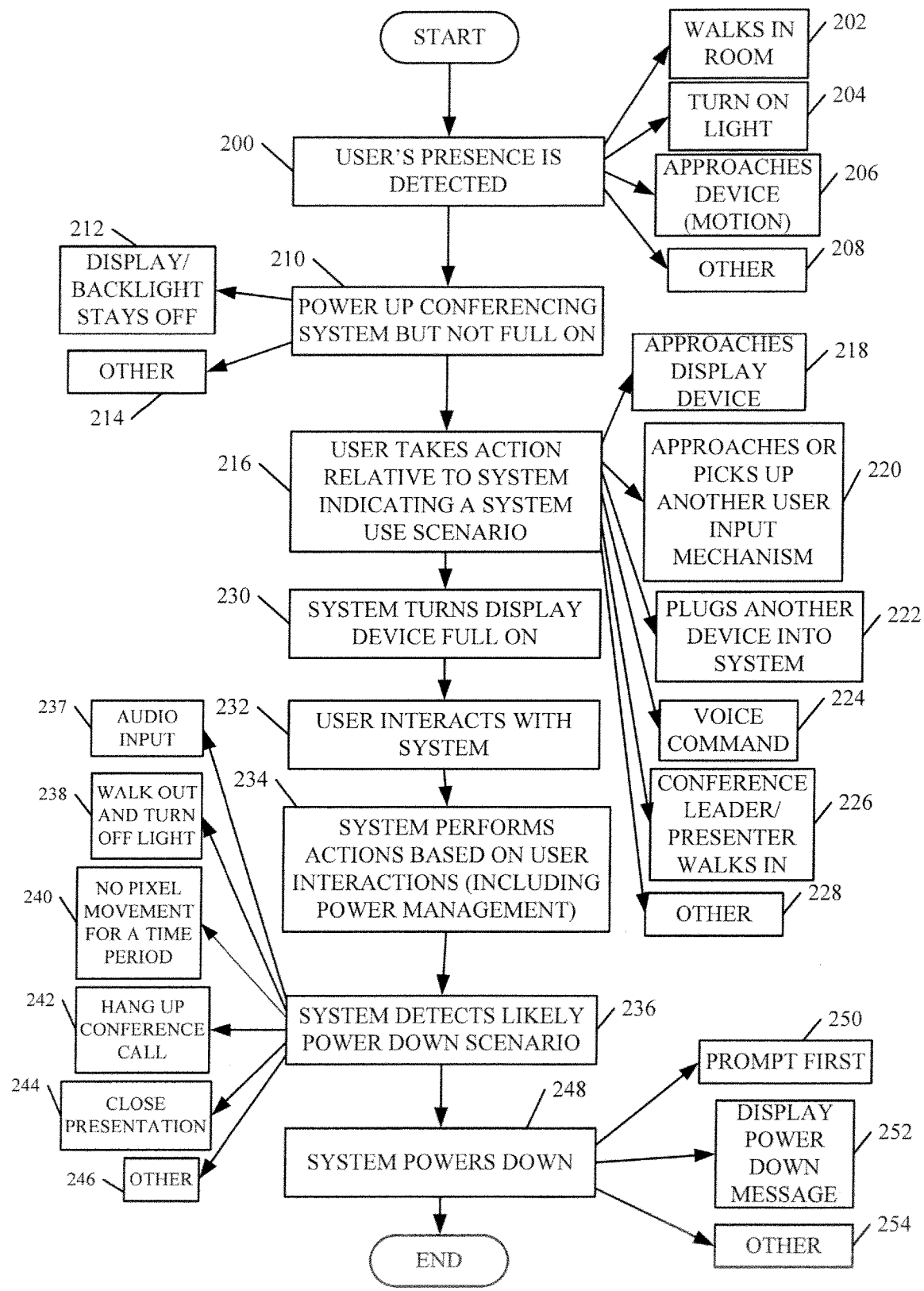
FIG. 4 is a flow diagram illustrating one embodiment of the operation of the architecture shown in FIG. 3 in automatically powering up and powering down a multimedia system.

FIG. 4 is a flow diagram showing one embodiment of the operation of power management component 168 in automatically powering up and powering down conferencing system 130. It will be noted that system 130 can be manually powered up and powered down by a given user 132 who simply actuates an appropriate user input mechanism causing system 130 to power up or power down. For instance, user 132 can simply actuate a power button to turn the system on and off. However, FIG. 4 shows one embodiment of the operation of power management component 168 in automatically powering up or powering down the system, based on a variety of different sensed parameters.

In one embodiment, power management component 168 first detects the presence of a user somewhere in the vicinity of system 130. This is indicated by block 200 in FIG. 4. In one embodiment, power management component 168 receives inputs from a variety of the sensors or user input mechanisms 140 that indicate that the user is present. By way of example, component 168 can receive an input from a microphone 184, a motion sensor, a camera 178, or a variety of other mechanisms that indicate that the user has walked into the conference room 112 where system 130 is deployed, or elsewhere in the vicinity of system 130. This is indicated by block 202.

Power management component 168 can also detect (such as by a light sensor input or a camera input) that a user has turned on a light in the conference room 112 or elsewhere in the vicinity of system 130. This is indicted by block 204. Component 168 can also detect that a user is approaching the device based on an input from a camera or an input from a motion sensor or otherwise. This is indicated by block 206. Of course, component 168 can detect the user's presence in other ways as well, such as by receiving an audio input or other inputs, and this is indicated by block 208.

Once component 168 has detected the user's presence, component 168 powers up conferencing system 130. However, in one embodiment, component 168 powers up only a subset of the parts of the system so the system is not fully powered up, in that all subsystems and components are not powered up at that time. This is indicated by block 210 in FIG. 4. By way of example, component 168 can power up the touch sensitive display device 102 but keep the backlight off, so that device 102 is not fully powered up. This is indicated by block 212. In doing this, component 168 can perform part of the power up process for the device so that when the user actually approaches the device or begins to use the device, the remaining part of the power up sequence does not take as long. However, by keeping the backlight off, device 102 is not distracting to people in its vicinity.

Component 168 can power up other parts of the conferencing system, but keep a different subset of its components or subsystems powered down, in other ways as well. This is indicated by block 214.

Once the user takes action relative to conferencing system 130, component 168 can analyze this action to determine whether it indicates that the user is entering a full system power up scenario. This is indicated by block 216 in FIG. 4.

By way of example, if component 168 detects (through appropriate sensor inputs) that a user is approaching the touch sensitive display device 102, this may be a power up scenario so component 168 powers up the rest of the system. This is indicated by block 218.

If the user approaches another user input mechanism (such as a stylus) or picks up a user input mechanism or otherwise touches a user input mechanism, this can also indicate that the user wishes to have the entire system powered up. This is indicated by block 220 in FIG. 4.

Component 168 can also detect that user 132 has plugged in another type of user device into system 130 (such as a laptop computer, a tablet computer, a smart phone, or another device). This can be interpreted as the user wishing to power up the system as well, and this is indicated by block 222 in FIG. 4.

Of course, if user 132 provides a voice command (which is received and understood by speech/natural language component 170) this can indicate that the user wishes to power up the system. This is indicated by block 224 in FIG. 4.

Other processing can be performed as well, in order to determine whether the user is entering a power up scenario. For instance, where conferencing system 130 allows a user to reserve a teleconference or meeting time or to schedule a teleconference or meeting, the user may be permitted to identify the leader or presenter at the teleconference or meeting. If the leader or presenter is known to system 130 (such as by having profile data stored in data store 142 for the leader or presenter), then system 130 can identify when the leader or presenter enters the room. By way of example, it may be that the leader or presenter is carrying an RFID badge or other wireless communication device, a smart phone or other mobile device that is known by system 130 to identify the leader or presenter. If system 130 detects the presence of that device, then system 130 can indicate to power management component 168 that the leader or presenter for the teleconference or meeting that is currently scheduled has entered the room. In that case, component 168 can power up the system as well. Of course, where the profile information for the leader or presenter includes facial recognition information, then, using a camera input, system 130 can identify that the presenter or leader has entered the room, based upon the presenter's or leader's facial features.

Indentifying that the leader or presenter has entered the room or is in the vicinity of system 130 is indicated by block 226 in FIG. 4.

It will be appreciated that system 130 (and component 168) can identify that the user wishes to power up the system in other ways as well. This is indicated by block 228. The particular ways described above are exemplary only.

Once power management component 168 has identified a power up scenario, it illustratively turns on touch sensitive display device 102 to the fully powered up state. This is indicated by block 230 in FIG. 4. Power management of the various subsystems can be performed as well, and this is discussed in more detail below with respect to FIG. 9.

Suffice it to say at this point, that the system is sufficiently powered up so that the user can perform various interactions with the system. Having the user interact with the system is indicated by block 232 in FIG. 4. The system 130 then performs various actions based upon the user interactions. A variety of these interactions are discussed below with respect to the remaining figures. This is indicated by block 234 in FIG. 4.

At some point, power management component 168 detects a likely power down scenario. This is indicated by block 236. As with the power up scenario, the power down scenario can be detected using a wide variety of different inputs. By way of example, component 168 can determine (such as through an audio input 237, a camera input, a light sensor input, etc.) that all of the participants in the conference or meeting have left the conference room and have turned off the light. This is indicated by block 238 in FIG. 4.

Component 168 can determine that there has been no pixel movement within the field of view of cameras 178 for a predetermined time. This may indicate that nobody is in the room or that the system should be powered down, because nobody is moving and no one is approaching the touch sensitive display device 102. This is indicated by block 240 in FIG. 4.

Where the presentation or conference is a teleconference, component 168 can be notified by conferencing subsystem 158 that the user has hung up the call. This can indicate that at least part of system 130 should be powered down, and this is indicated by block 242 in FIG. 4.

Where the conference or presentation is a whiteboard presentation or another presentation using touch sensitive display device 102, component 168 can identify a potential power down scenario when the user has closed the presentation application that is being used to make the presentation. This is indicated by block 244.

It will be appreciated that potential power down scenarios can be detected in a wide variety of other ways as well. This is indicated by block 246 in FIG. 4.

In response to identifying a power down scenario, power management component 168 illustratively powers down conferencing system 130. This is indicated by block 248 in FIG. 4. This can be done in a variety of different ways as well. Touch sensitive display control component 156 can generate a prompt for the user on touch sensitive display device 102. For instance, the prompt can ask the user whether the user wishes to power down the system, and wait for a user input. Prompting the user is indicated by block 250 in FIG. 4. Touch sensitive display control component 156 can generate and display a power down message and power the system down without waiting for a user input. This is indicated by block 252 in FIG. 4.

The component 168 can power down the system in a variety of other ways as well, such as by generating an audio prompt or an audio power down message, such as by simply powering the system down without generating a prompt or a message, or in other ways. This is indicated by block 254 in FIG. 4.

Figure 5:
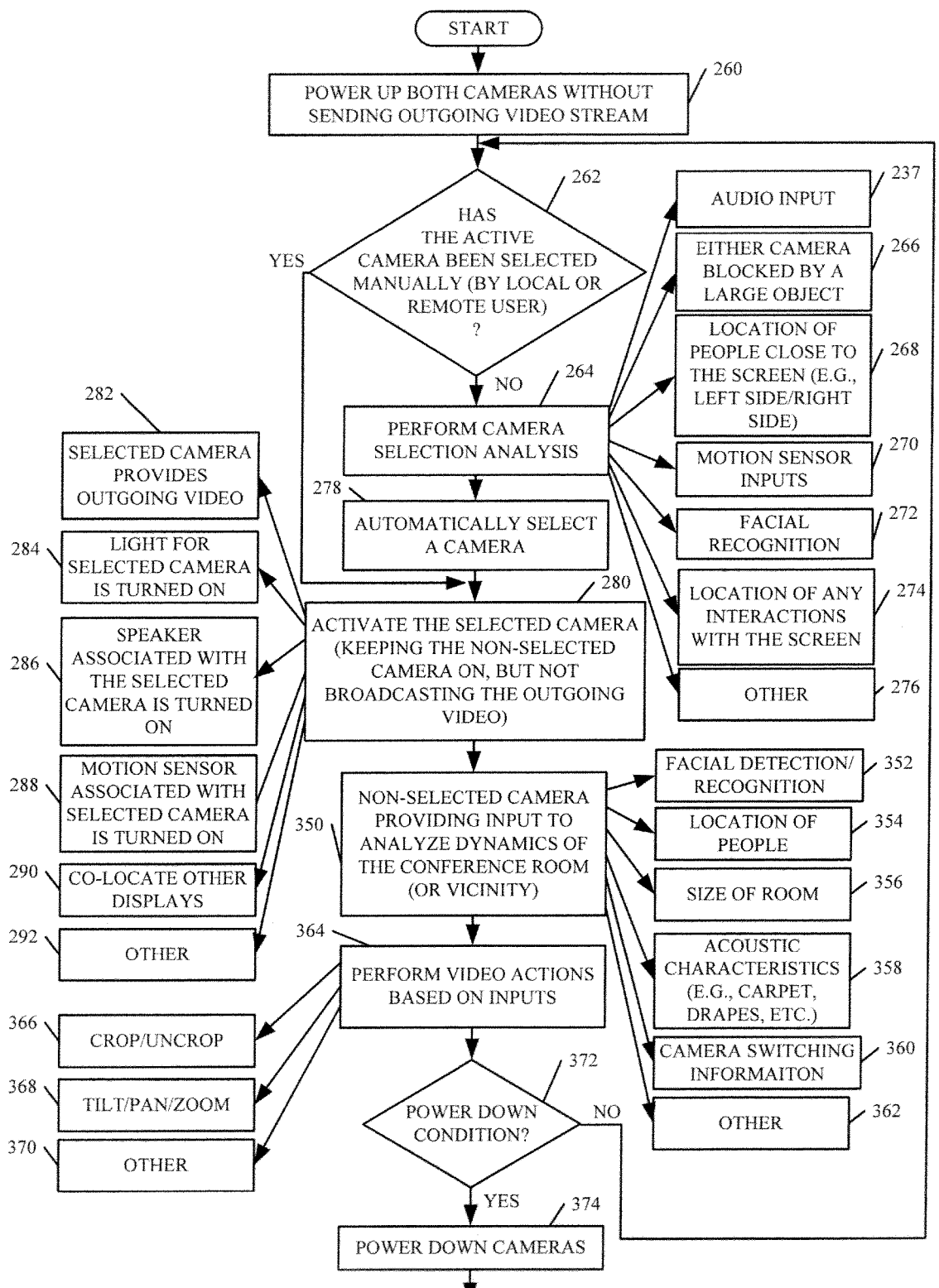
FIG. 5 is a flow diagram illustrating one embodiment of the architecture shown in FIG. 3 in controlling outgoing video and camera switching.

FIG. 5 is a flow diagram illustrating one embodiment of the operation of camera control component 166 in controlling which camera 178 (or which camera 104 and 106 or 124 and 126 in FIGS. 1 and 2) generates the outgoing video stream. In one embodiment, a power management component 168 powers up both cameras without sending an outgoing video stream from either of them. This is indicated by block 260 in FIG. 5. Camera control component 166 then determines whether an active camera has been selected manually by either a local user or a remote user. This is indicated by block 262. By way of example, a local user 162 can illustratively approach one of cameras 178 (or touch sensitive display device 102) and actuate a suitable user input mechanism to manually select one of the cameras as the active camera. Also, in one embodiment, a remote user 135 can actuate a suitable user input mechanism to select one of the cameras as an active camera as well. If this is the case, then camera control component 166 simply activates the manually selected camera as the active camera. If not, however, then camera control component 166 performs an automatic camera selection analysis based on a variety of inputs, in order to identify one of the cameras as the camera that should be activated. Performing the automatic camera selection analysis is indicated by block 264 in FIG. 5.

In performing the analysis, camera control component 166 can base the analysis on a wide variety of input criteria. For instance, camera control component 166 can receive an audio input 265 and analyze it to identify a location of a speaker or other parameter.

In addition, camera control component 166 can analyze the video stream generated by the cameras to determine whether either of the cameras is blocked by a large object. If so, camera control component 166 can select the other camera as the active camera. Determining whether a camera is blocked by a large object is indicated by block 266 in FIG. 5. This may happen, for instance, where a user is making a presentation both locally, and to remote users. If the user has his or her back turned to the active camera and his or her head is closely proximate the active camera, then camera control component 166 determines that the user is blocking that camera, and selects the opposite camera as being the active camera, to provide the outgoing video.

Also, in one embodiment, camera control component 166 can determine whether a user is facing the camera, but is in closer proximity to one camera than to the other camera. Referring, for example, to FIG. 2, if the user is located in location 118, such that the user is closer to camera 124, and facing display screen 110, then control component 166 illustratively selects camera 124 as the active camera so that the user's face can be captured, even though the user is close to the display screen 110. Using the location of a person close to the screen (such as the left side or the right side) to select a camera is indicated by block 268 in FIG. 5.

Camera control component 166 can also receive inputs from other sensors (such as a motion sensor) to indicate whether there is movement close to one of the cameras. If so, camera control component 166 can select that camera as the active camera. Receiving a motion sensor input is indicated by block 270 in FIG. 5.

Camera control component 166 can also use facial recognition to select the active camera. By way of example, it may be that the user's or presenter's face can be recognized by system 130, based upon facial recognition profile information, or otherwise. In that case, camera control component 166 can select, as the active camera, the particular camera that gives the best view of the presenter's or leader's face, no matter where that person is in the room. Using facial recognition to select the active camera is indicated by block 272 in FIG. 5.

Camera control component 166 can also use inputs from other sensors or user input mechanisms in order to select the active camera. For instance, if the user touches touch sensitive display device 102 at a given location on screen 110, component 166 can select the camera closest to that location as the active camera. Further, if the user picks up or touches one of the styluses 176, component 166 can select, as the active camera, the camera that is closest to that stylus. Further, using microphone beam forming, the location of a given user's voice can be roughly located and the camera closest to that user can be selected as the active camera. This can also help for users in the room who are, for example, on the far right side of the room. Since the microphone can detect that, it can swap to the left camera which would have a better view of the person further down on the right. For instance, if the presenter is making a presentation, but a member of the local audience is asking a question, the audio beam forming process can identify, in general terms, the location of that user, or the general direction of that user. Component 166 can then activate the camera that gives the best view of that location. Selecting a camera based upon locations of any user interactions with the screen or other user input devices is indicated by block 274 in FIG. 5.

Component 166 can select a camera as the active camera in other ways as well. For example, where the component 166 receives a sensor input indicating that a member of the audience is approaching the touch sensitive display 102, component 166 can select, as the active camera, the one that gives the best view of that user's location as they approach the touch sensitive display 102. Selecting a camera as the active camera in other ways is indicated by block 276 in FIG. 5.

Based upon the analysis, component 166 then selects one of the cameras as the active camera. This is indicated by block 278 in FIG. 5.

Component 166 then activates the selected camera. This is indicated by block 280. In one embodiment, camera control component 166 keeps the non-selected camera on, but in a non-broadcasting state so that it does not provide the outgoing video. This can assist in the camera switching process. For instance, where component 166 switches back and forth between the cameras at a relatively frequent rate, keeping both cameras on (even though only one at a time is selected) can make the switching process quicker, because the power up sequence for the selected camera does not need to be fully under taken.

Activating the selected camera can be done in a number of different ways as well. For instance, component 166 can first control the selected camera so that it provides the outgoing video to conferencing subsystem 158. This is indicated by block 282 in FIG. 5. Also, in one embodiment, component 166 provides some visual indication that indicates which camera is the selected and active camera. This can be done, for instance, by turning on a light (such as an LED or another source of illumination) that is mounted to device 102 closely proximate the selected camera. This is indicated by block 284. In addition, component 166 can indicate to audio control component 164 which camera is the selected camera, and audio control component 164 can then activate the speaker that is associated with the selected camera so that the speaker mounted to device 102 next to the selected camera is turned on, or made louder, etc. This is indicated by block 286. In addition, where motion sensors are located proximate each of the cameras, camera control component 166 can indicate to sensor control system 172 which of the cameras is selected as the active camera, and system 172 can then activate the motion sensor that is mounted to device 102 and located closely proximate the selected camera. This is indicated by block 288 in FIG. 5.

Further, other actions can be taken based upon which camera is the selected camera as well. For instance, when a presenter is closely proximate the touch sensitive display device 102, and one of the cameras is activated, that may indicate that the user is closer to that camera than the opposite camera. In that case, touch sensitive display control component 156 illustratively displays the incoming video of remote users, along with the touch sensitive pallet of control components, on the side closest to the selected camera. This can make it easier for the user to control the system.

By way of example, and again referring to FIG. 2, assume that user 132 is facing display 110 in position 118. In that embodiment, camera control component 166 illustratively selects camera 124 as the active camera to obtain an image of the user's face, when the user is located in position 118. Because the user is closer to camera 124 than to camera 126, touch sensitive display control component 156 also illustratively switches the display of the incoming video on display 110 so that it is closely proximate location 118 on display 110. Further, component 156 can display touch sensitive control mechanisms on the user interface display at a location that is close to location 118, so that the user can easily actuate those control mechanisms using touch gestures on display 110. Collocating the other displays in this way is indicated by block 290 in FIG. 5. Camera control component 166 can, of course, perform other actions based upon which camera is activated. This is indicated by block 292.

Figure 6:
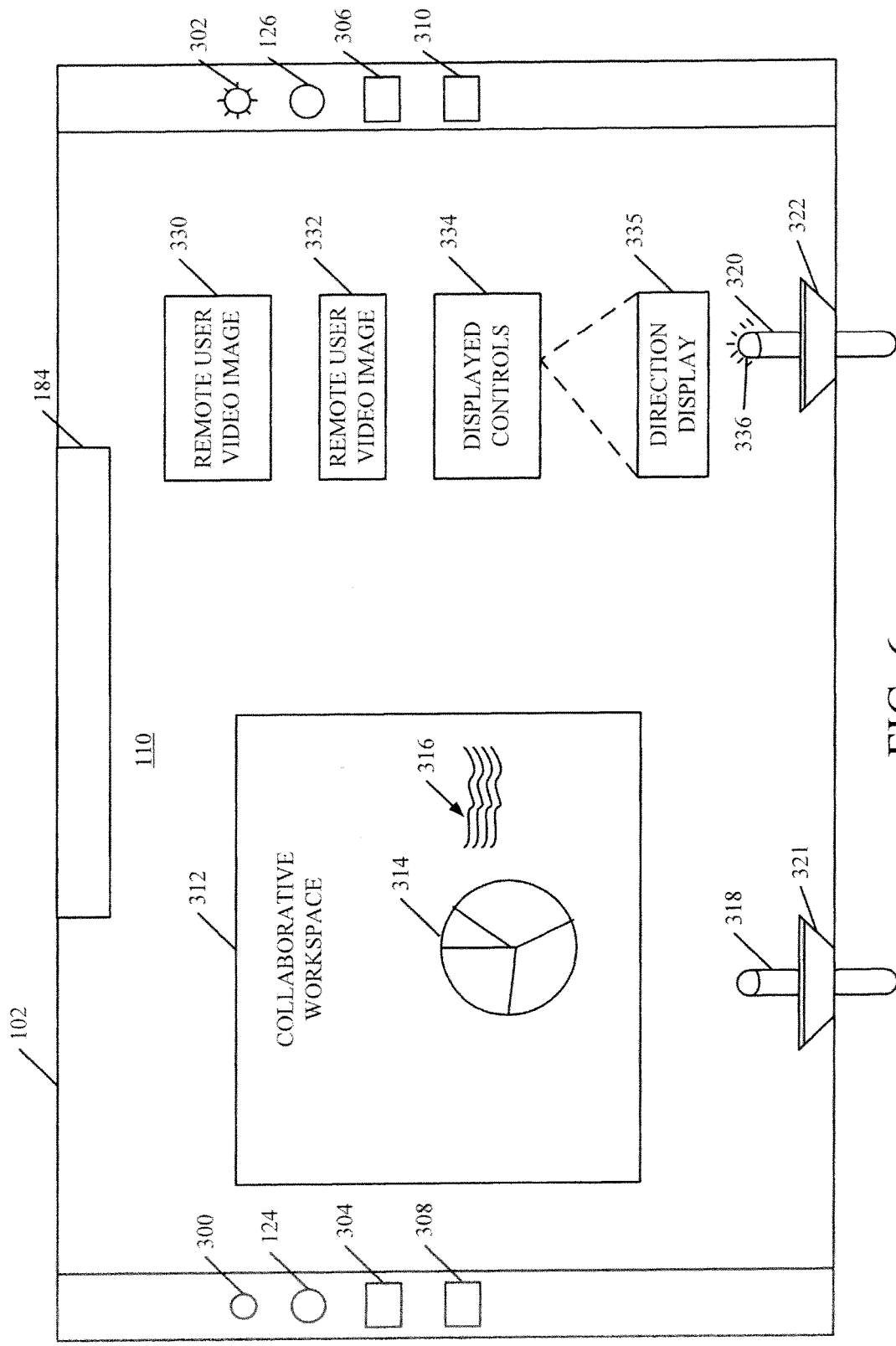
FIG. 6 shows one embodiment of a user interface display on a touch sensitive screen.

FIG. 6 shows one embodiment of a touch sensitive display device 102, which is similar to that shown in FIG. 2. Similar items are similarly numbered. Thus, it can be seen that cameras 124 and 126 are located on the opposite sides of display 110. Each camera has an associated light source (e.g., a LED) 300 and 302, respectively. Also, there is illustratively a speaker 304 and 306 located closely proximately camera 124 and 126, respectively. In addition, in one embodiment, motion sensors 308 and 310 are also located closely proximate cameras 124 and 126, respectively.

FIG. 6 shows that display 110 is currently displaying a collaborative workspace 312 that allows a user to collaborate with other, remote or local users, to perform work on collaborative workspace 312. It can be seen that, in the example shown in FIG. 6, the users have generated a pie chart 314 and a set of notes 316 on the collaborative workspace. Of course, a wide variety of other content or information can be displayed on collaborative workspace 312 as well. FIG. 6 also shows that device 102 includes first and second styluses 318 and 320 located generally on longitudinally opposite sides of display 110. Each stylus can be located in a holster 322 and 324, respectively, so that they can be removed and used by a user to point to or draw on collaborative workspace 312, or anywhere else on touch sensitive display 110.

In the embodiment shown in FIG. 6, camera control component 166 has identified that the user is approximately in the location 120 (shown in FIG. 2) which is closer to camera 126, than to camera 124. Therefore, camera control component 166 has illustratively selected camera 126 and activated it. In one embodiment, camera control component 166 has also illuminated light source 302 to give a visual indication that camera 126 is the active camera. Component 166 also illustratively communicates with the other components in multimedia processing system 138 to activate speaker 306 and motion sensor 310, both of which are also closer to camera 126 than to camera 124.

Based on the selection of camera 126 as the active camera, collaborative display control component 162 moves the collaborative workspace 312 to the opposite side of display 110 so that touch sensitive display control component 156 can display the remote user video images (e.g., the incoming videos) in a location of display 110 that is closely proximate camera 126. The remote user video images are indicated by blocks 330 and 332, respectively. It can be seen that, in one embodiment, when a remote user is speaking or has indicated a desire to speak (such as by unmuting himself or herself) that remote user's corresponding video image can be enlarged (e.g., image 330 is larger than image 332).

Further, component 156 also displays the control user input mechanisms, which can be actuated using touch gestures to control device 102, on a region of display 110 that is also closer to camera 126 than to camera 124. Because the user is located on that side of the display device 102, the displayed controls are illustratively displayed close to the user so that they can be easily actuated by the user. The displayed controls are indicated by block 334 in FIG. 6. FIG. 6 also shows that, in one embodiment, because the user is standing closer to stylus 320 then to stylus 318, system 130 illuminates a light source 336 on stylus 320 so that the user can easily identify that stylus and use it.

Further, when the user reaches for a user input mechanism, the system can automatically display directions or other helpful information for using that mechanism. For instance, where the user reaches for one of displayed controls 334, the system can automatically display a direction display 335 describing the control.

Referring again to the flow diagram of FIG. 5, camera control component 166 can illustratively control the non-selected camera as capturing images to provide input to analyze a variety of different things, such as the acoustic dynamics of the conference room (or the vicinity of device 102). This is indicated by block 350 in FIG. 5. By way of example, the non-selected camera (e.g., camera 124) can be used to capture images that are analyzed for facial detection or facial recognition. This is indicated by block 352. Camera 124 can also be used to capture images that are analyzed to determine the location of various people in the conference room or otherwise in the vicinity of device 102. This is indicated by block 354. The non-selected camera 124 can also be used to analyze the size of the conference room, or the acoustic characteristics of the room (such as whether it has drapes, carpeting, etc.). This is indicated by blocks 356 and 358, respectively. The non-selected camera 124 can also be used to capture images that can provide information to control component 166 in order to perform further camera switching analysis. This is indicated by block 360. Of course, the non-selected camera 124 can be used to provide other information as well. This is indicated by block 362.

Camera control component 166 can also perform a variety of other video actions, using the cameras, based upon a variety of inputs from user input/output mechanisms and sensors 140. This is indicated by block 364 in FIG. 5. By way of example, camera control component 166 can control the selected camera to crop and un-crop the images based upon the video being captured. For instance, where a user is approaching the camera, component 166 can crop tightly to that user's face. However, where a user is moving away from the camera, component 166 can un-crop in a gradual or continuous way, or in another way. This is indicated by block 366 in FIG. 5.

Camera control component 166 can also control the selected camera 166 to perform tilt, pan and zoom operations. This is indicated by block 368. By way of example, where the presenter or a speaker is identified, component 166 can control the selected camera to follow that person and to maintain an image of that person, using tilt, pan and zoom functions on the camera. Of course, these functions can be used to perform other operations as well.

Control component 166 can also perform other video operations based on a variety of different inputs. This is indicated by block 370 in FIG. 5.

In one embodiment, camera control component 166 continues to perform these operations until power management component 168 determines that a power down condition exists for that camera. This is indicated by block 372 in FIG. 5. When that happens, power management component 168 powers down the camera. This is indicated by block 374.

Figure 7:
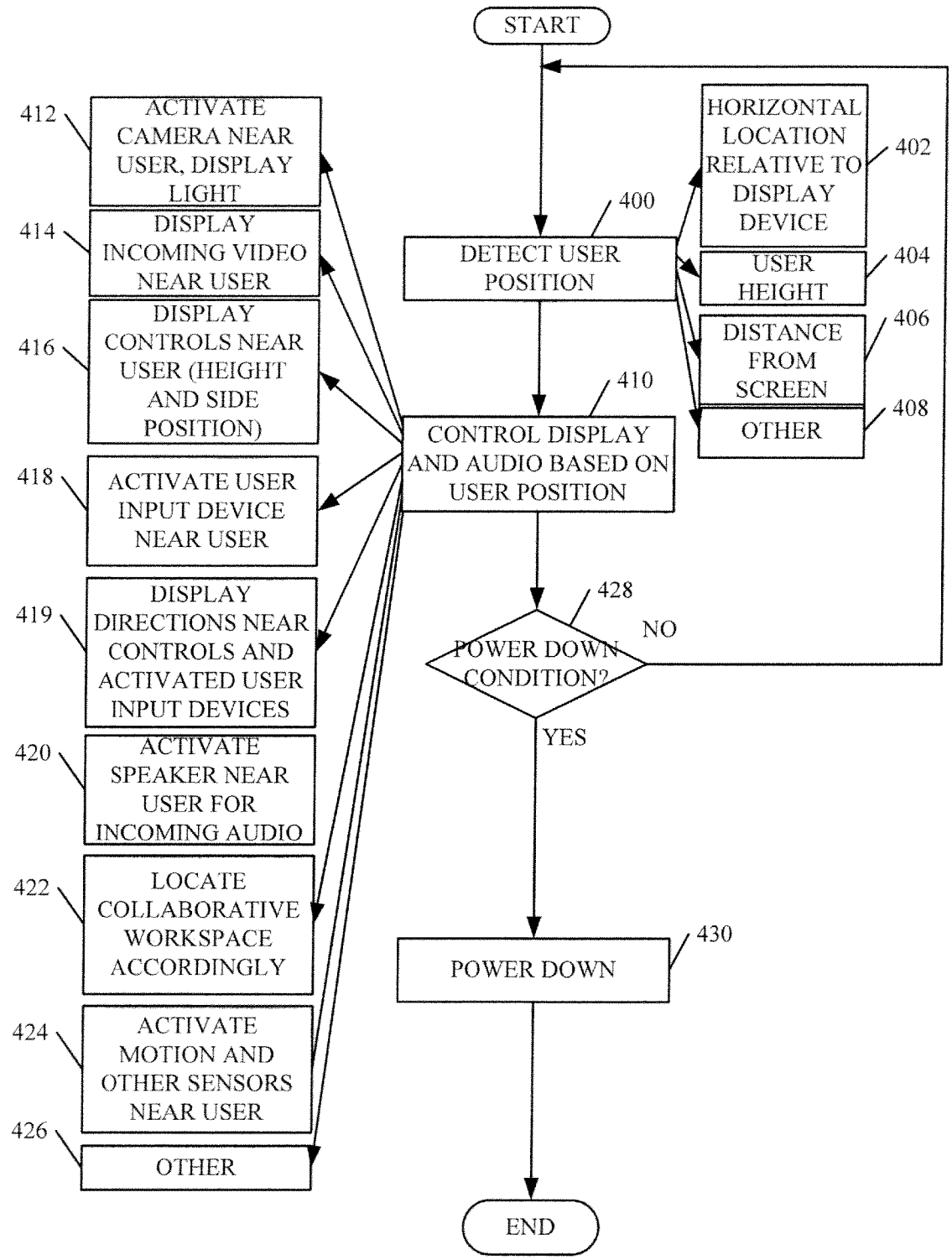
FIG. 7 is a flow diagram illustrating one embodiment of the operation of the architecture shown in FIG. 3 in displaying images and incoming video on the touch sensitive screen as well as in playing audio.
Figure 8:
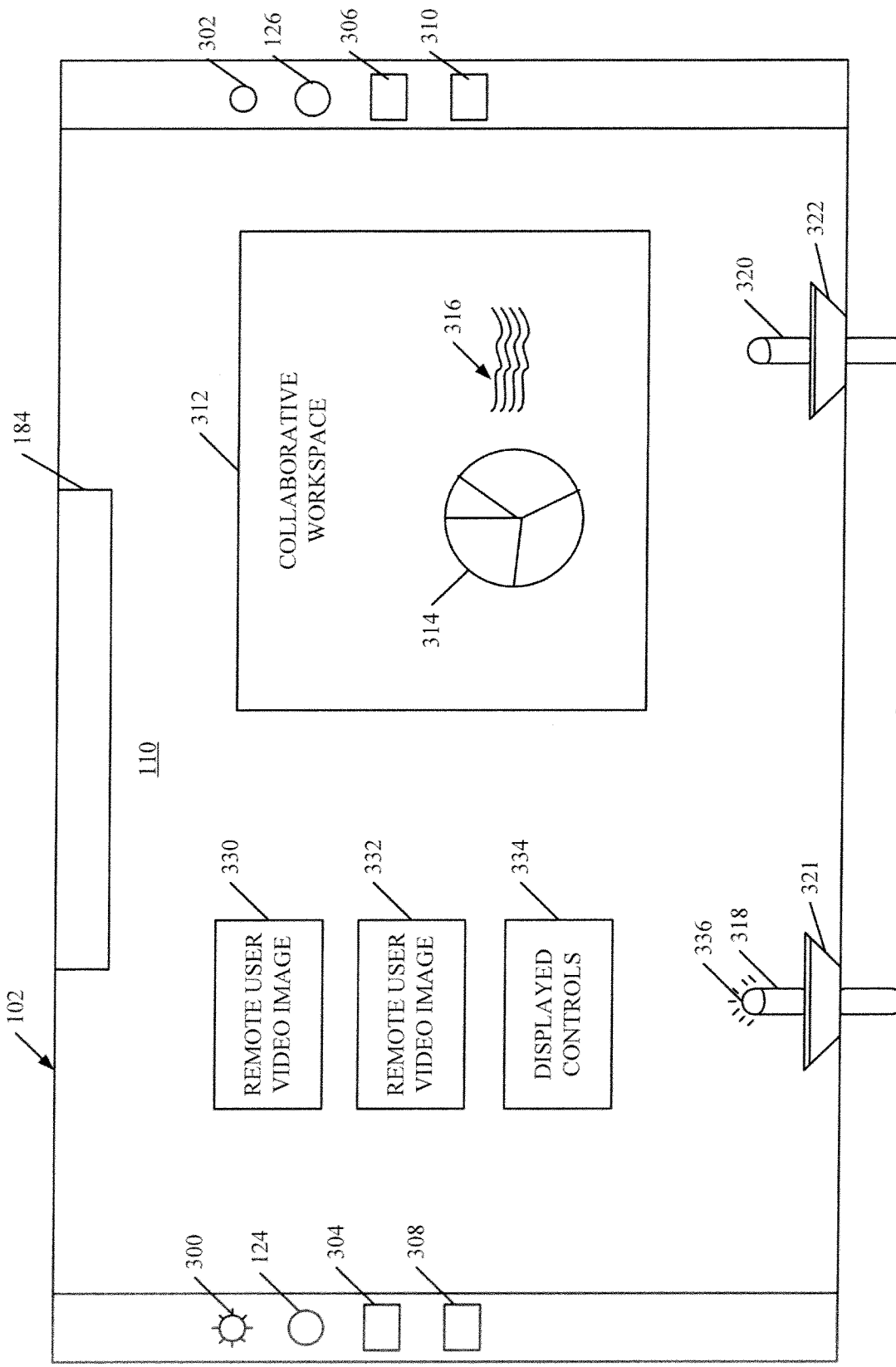
FIG. 8 is one embodiment of a user interface display on the touch sensitive screen.

FIG. 7 is a flow diagram illustrating one embodiment of the operation of touch sensitive display control component 156 in generating a display of the incoming video, and also of displaying various other images and generating audio outputs from device 102. FIG. 8 is one exemplary user interface display. FIGS. 6-8 will now be described in conjunction with one another.

Control component 156 first (using inputs from user input/output mechanisms and sensors 140) receives an indication as to the general position of a user. This is indicated by block 400 in FIG. 7. In one embodiment, component 156 can identify the horizontal location of the user relative to display device 102 (e.g., whether the user is closer to camera 124 or camera 126). This is indicated by block 402. However, component 156 can also illustratively identify the user's height. This is indicated by block 404. Component 156 can use cameras 124 and 126 to triangulate to obtain a distance of the user from display screen 120. This is indicated by block 406. Of course, component 156 can obtain this information from a touchless natural input device 182 or other sensors as well. In addition, component 156 can detect the user's location or position in other ways as well. This is indicated by block 408.

Component 156 then, in conjunction with other components in system 138, controls the display of items on display 110 based upon the user's location. This is indicated by block 410 in FIG. 7. First, as described with respect to FIG. 5, camera control component 166 can activate the camera nearest the user and turn on the light 300 or 302. This is indicated by block 412. It can be seen in FIG. 6 that the user is located closer to camera 126, while in FIG. 8, the user is located closer to camera 124.

Control component 156 also displays the incoming video nearest the user (e.g., nearest the activated camera). This is indicated by block 414. It can be seen that the remote user video images 330 and 332 are displayed in a position that is closer to the detected position of the user, relative to display screen 110. In FIG. 6, this is on the right hand side of the display, while in FIG. 8 this is on the left hand side of the display. When the incoming video images are moved from side to side, they can be controlled to perform any desired visual effect, such as sucking in to disappear, and inflating to reappear, etc.

FIG. 7 also shows that component 156 illustratively displays the touch-sensitive controls 334 nearest the user as well. This is indicated by block 416 in FIG. 7. In FIG. 6, they are displayed on the right side of screen 110, while in FIG.

8 they are displayed on the left side of the screen. FIG. 7 also indicates that the controls can illustratively be displayed at an appropriate height. For instance, since the height of the user can be determined based upon the sensor inputs, if the user is tall, the controls can be displayed higher. If the user is shorter, the controls can be displayed lower. In addition, the touch sensitive gestures can be adjusted as well. By way of example, it is not uncommon for certain touch gestures to ask the user to swipe from the top of the screen down, or from the left or right of the screen in the opposite direction. When the user is relatively small in stature, it may be difficult for the user to reach the top of the screen, or either side. Therefore, the touch gestures can be modified so that the user does not have to reach all the way to the top of the screen or to either side of the screen, in order to invoke the necessary control, given those types of touch gestures.

In another embodiment, system 138 activates the user input mechanisms that are closest to the user. For instance, as described above, the stylus that is closest to the user's position may be activated. In FIG. 6, this is stylus 320, while in FIG. 8, this is stylus 318. Activating the user input devices nearest the user is indicated by block 418 in FIG. 7.

Further, audio control component 164 activates the speaker nearest the user so that the incoming audio is played from the speaker nearest the user. This is indicated by block 420.

Display control component 156 also illustratively displays the collaborative workspace 312 in an appropriate location. This is indicated by block 422. This can be displaying the workspace 312 closest to the user, or on the opposite side as the user, or directly in front of the user, or otherwise.

System 138 also illustratively activates the motion and other sensors nearest the user. This is indicated by block 424. Of course, touch sensitive display control component 156 can take other actions based on the detected user position. This is indicated by block 426.

The various components in system 138 continue to perform this type of displaying of the various components on user interface display 110, and to activate the various user input mechanisms, based upon the user position and other detected inputs until a power down condition is detected. This is indicated by block 428. When that occurs, the various components and systems and subsystems can be powered down, as desired. This is indicated by block 430.

Figure 9:
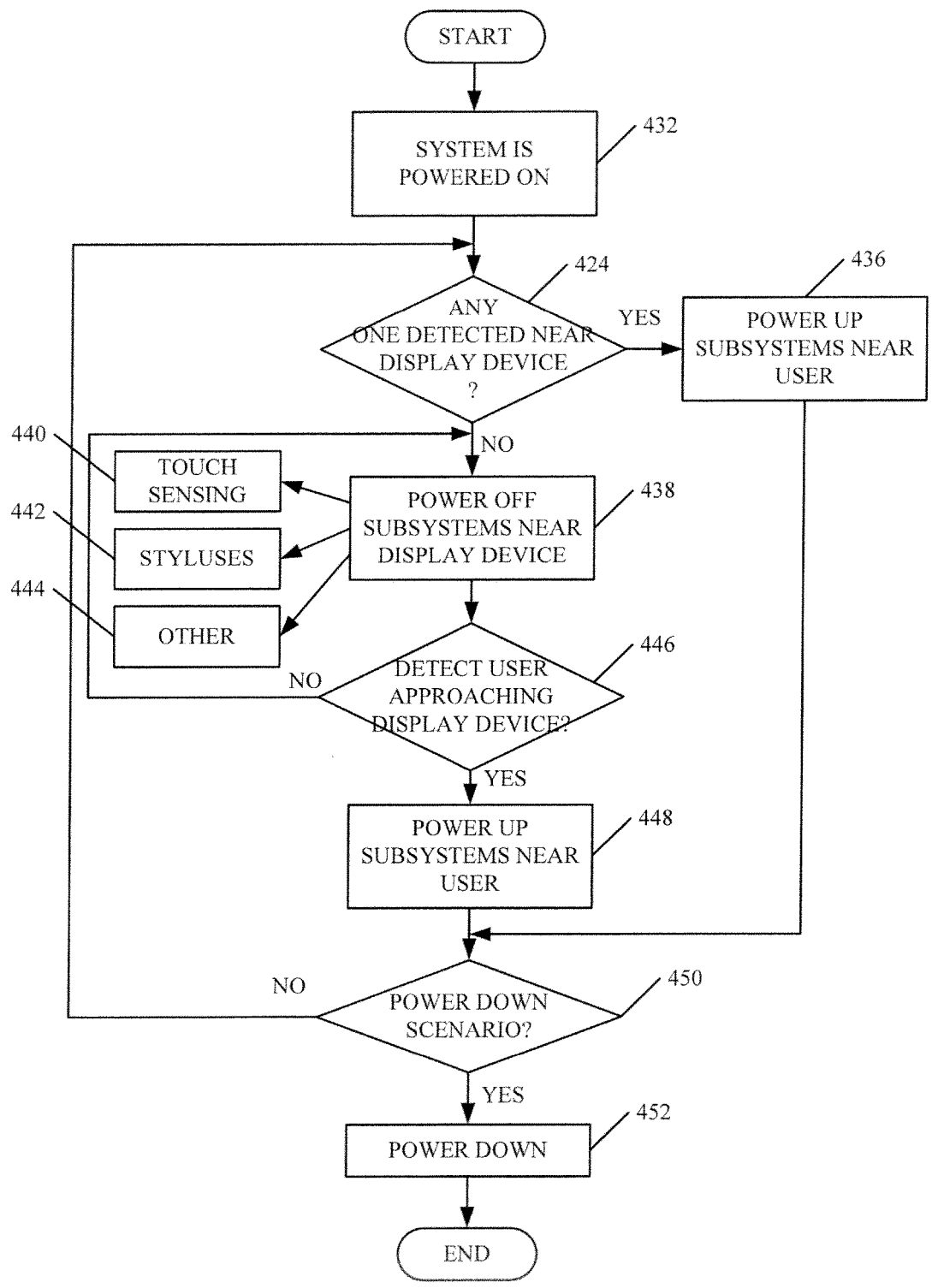
FIG. 9 is a flow diagram illustrating one embodiment of the operation of the architecture shown in FIG. 3 in performing power management based on user interactions with the system.

FIG. 9 is a flow diagram illustrating one embodiment in which power management component 168 manages the power for various subsystems, even when most of system 130 is powered up. For instance, component 168 first determines that the system is to be powered up either partially or fully. This is indicated by block 432 in FIG. 9. Component 168 can then be provided with inputs that allow it to determine whether anyone is relatively close to touch sensitive display device 102, or to one of the user input/output mechanisms 140. This is indicated by block 434. If so, power management component 168 powers up the subsystems near the user. This is indicated by block 436. By way of example, if the user is near stylus 320, power management component 168 provides power to that stylus, while keeping stylus 318 powered down.

However, if, at block 434, no one is detected as being near touch sensitive display device 102, then power management component 168 illustratively powers off various subsystems that are on or near display device 102. This is indicated by block 438.

By way of example, if no one is near the display device 102, then power management component 168 can power down the touch sensing mechanisms on the display device. This is indicated by block 440. Also, if no one is near device 102, then power management component 168 can power down both styluses. This is indicated by block 442. Power management component 168 can power down other subsystems or components as well. This is indicated by block 444.

When power management component 168 is provided with various inputs that indicate that a user is approaching the display device, power management component 168 illustratively powers up the appropriate components or subsystems. This is indicated by block 446. For instance, if a user is approaching the right hand side of the display device, then power management component 168 may illustratively power up the corresponding stylus or other user input mechanisms on that side of device 102. Powering up the subsystems near the user is indicated by block 448 in FIG. 9.

Power management component 168 illustratively continues to control power management of the system in these various ways until a power down scenario is detected. This is indicated by block 450. When that occurs, power management component 168 powers down the desired systems, subsystems, components, etc. This is indicated by block 452.

This is not an exhaustive list of power management features, and others can be implemented as well. For example, system 130 can have knowledge of a calendar for the device 102 or conference room in which it is located. Component 168 can use the time and date when meetings are supposed to start, along with attendee information, to control power management. Component 168 can, for instance, automatically power up device 102 and call other attendees of a meeting, or call into a conference call, without user interaction. This can be done based on meeting start time and conference call or attendee information.

Figure 10:
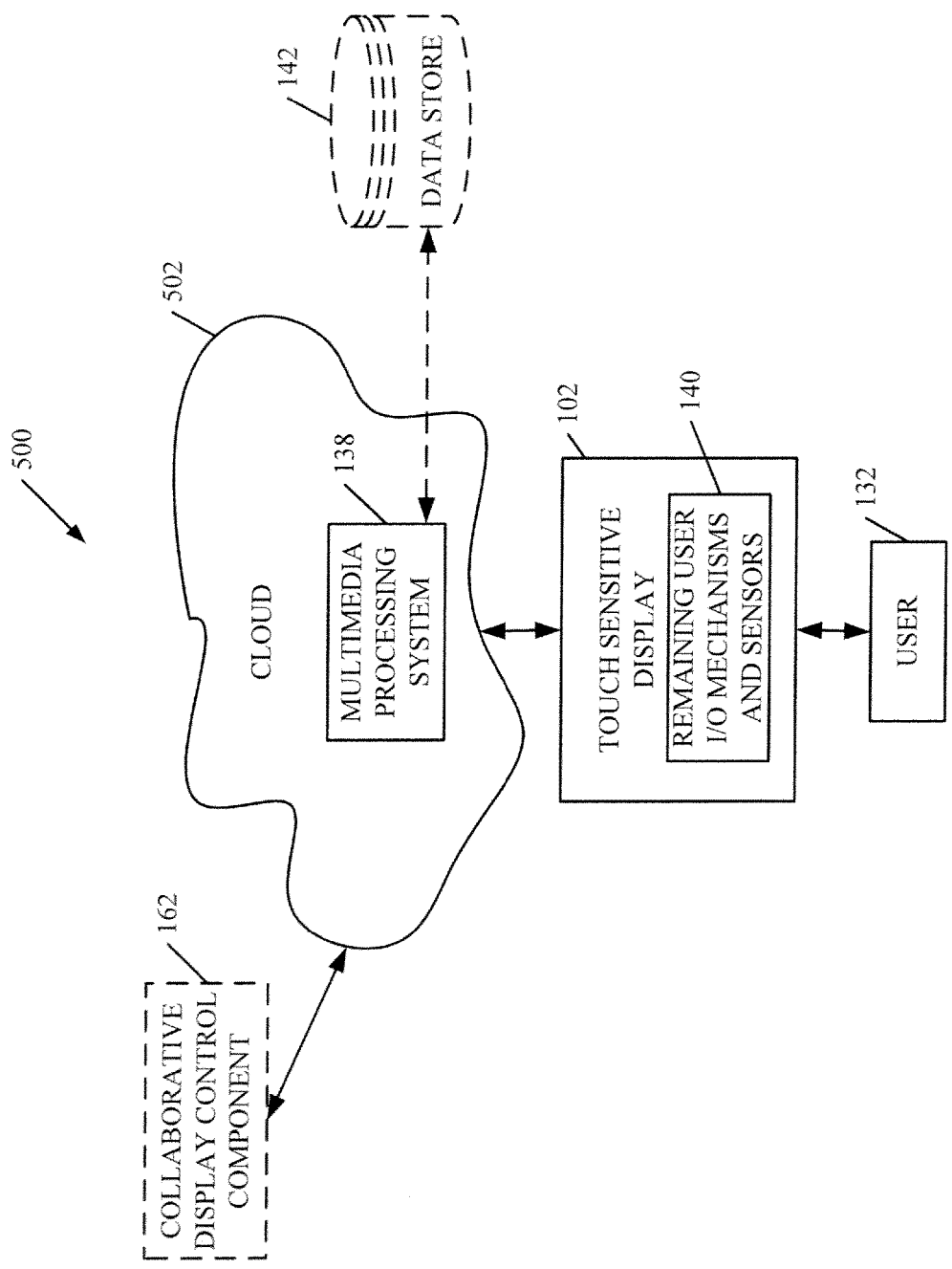
FIG. 10 shows one embodiment of the architecture shown in FIG. 3 deployed in a cloud-based architecture.

FIG. 10 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 10, some items are similar to those shown in FIGS. 1-3 and they are similarly numbered. FIG. 10 specifically shows that multimedia processing system 138 is located in cloud 502 (which can be public, private, or a combination where portions are public while others are private). Therefore, user 132 uses touch sensitive display device 102 to access those systems through cloud 502.

FIG. 10 also depicts another embodiment of a cloud architecture. FIG. 10 shows that it is also contemplated that some elements of architecture 100 are disposed in cloud 502 while others are not. By way of example, data store 142 can be disposed outside of cloud 502, and accessed through cloud 502. In another embodiment, collaborative display control component 162 (or other components) is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
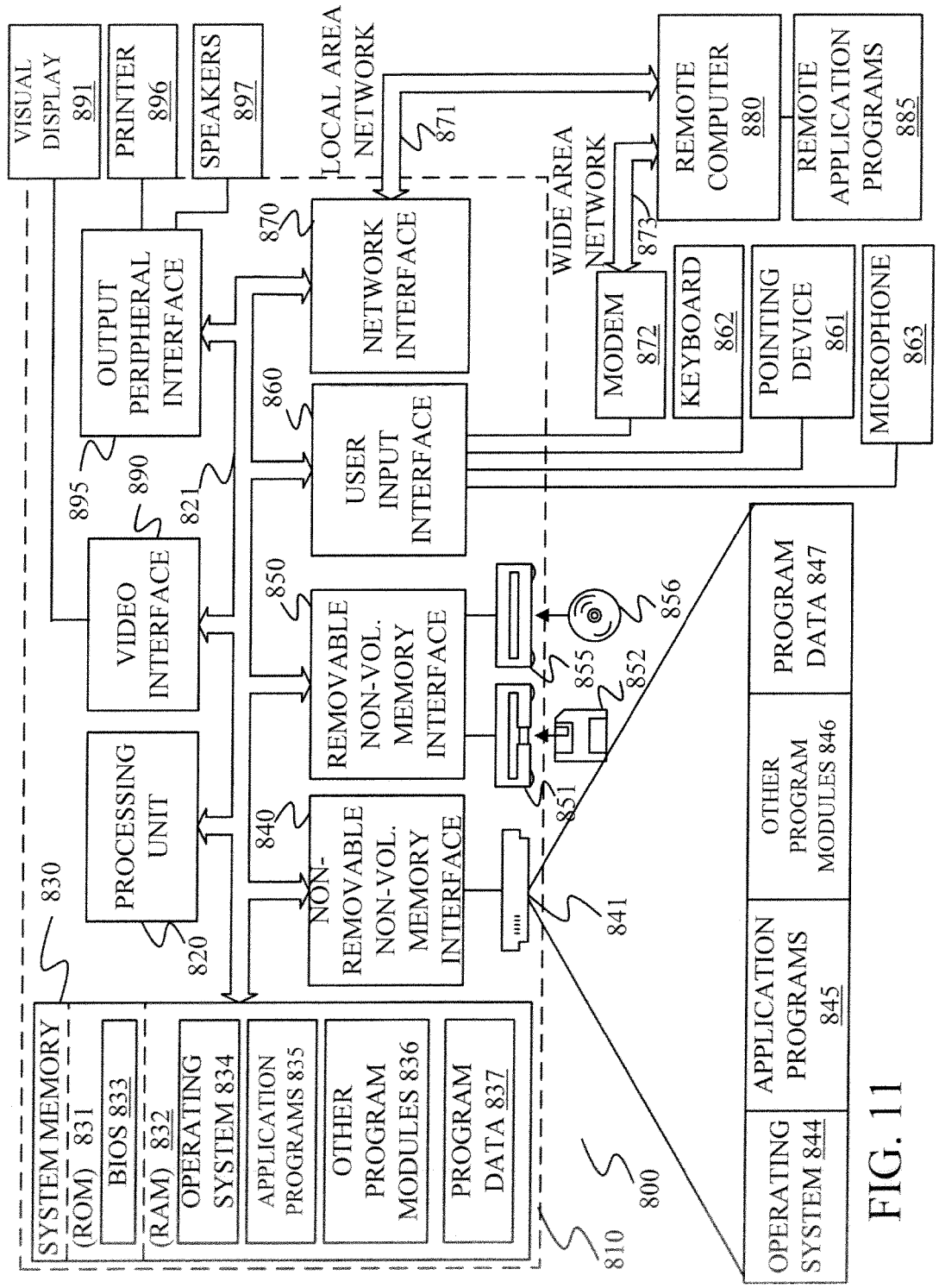
FIG. 11 is a block diagram of one illustrative computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 154), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 3 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, touch screen 110, a microphone 863, and a pointing device 861, such as a mouse, trackball or touch pad. Other input devices such as those described above with respect to FIG. 3 can be used, and still others (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of controlling a display on a conferencing system, comprising:
   detecting a user position relative to a touch sensitive display screen in the conferencing system;
   detecting a user height;
   based on the detected user position and the detected user height, selecting a portion of the touch sensitive display screen as a user interface (UI) control display location;
   displaying a touch-enable UI control at the UI control display location;
   receiving a touch input through the UI control; and
   performing an action in the conferencing system based on the touch input.

2. The computer-implemented method of claim 1 and further comprising:
   detecting that the user position relative to the touch sensitive display screen has changed to an updated user location; and
   performing the steps of identifying a display location and displaying the displayed item, based on the updated user location.

3. The computer-implemented method of claim 1 wherein identifying a display location comprises:
   identifying an incoming video display location based on the detected user position, and
   displaying an incoming video image at the incoming video display location.

4. The computer-implemented method of claim 1, and further comprising:
   determining that a user represented in the incoming video image is currently speaking or is about to speak; and
   in response to the determination, modifying the incoming video image.

5. The computer-implemented method of claim 4, wherein modifying the incoming video image comprises:
   enlarging the incoming video image.

6. The computer-implemented method of claim 1, and further comprising:
   automatically selecting one of first and second cameras associated with the conferencing system to provide outgoing video based on the detected user position.

7. The computer-implemented method of claim 1, and further comprising:
   activating a user input mechanism based on the detected user position.

8. An electronic conferencing system comprising:
   at least one processor; and
   memory storing instructions executable by the at least one processor, wherein the instructions configure the electronic conferencing system to:
   detect a user position relative to a touch sensitive display screen in the conferencing system;
   detect a user height;
   based on the detected user position and the detected user height, select a portion of the touch sensitive display screen as a user interface (UI) control display location;
   display a touch-enable UI control at the UI control display location;
   receive a touch input through the UI control;
   perform an action in the conferencing system based on the touch input.

9. The electronic conferencing system of claim 8, wherein the instructions configure the electronic conferencing system to:
   detect that the user position relative to the touch sensitive display screen has changed to an updated user location; and
   based on the updated user location,
   identify the display location; and display the displayed item based on the identified display location.

10. The electronic conferencing system of claim 8, wherein the instructions configure the electronic conferencing system to:
   identify an incoming video display location based on the detected user position;
   display an incoming video image at the incoming video display location.

11. The electronic conferencing system of claim 10, wherein the instructions configure the electronic conferencing system to:
   determine that a user represented in the incoming video image is currently speaking or is about to speak; and
   in response to the determination, modify the incoming video image.

12. The electronic conferencing system of claim 11, wherein the instructions configure the electronic conferencing system to modify the incoming video image by enlarging the incoming video image.

13. The electronic conferencing system of claim 8, wherein the instructions configure the electronic conferencing system to:
   automatically select one of first and second cameras associated with the conferencing system to provide outgoing video based on the detected user position.

\* \* \* \* \*